June 5, 1956 T. F. SMUSZ 2,749,032
BOOKKEEPING DEVICE WITH CASH DRAWER
Filed Dec. 4, 1953 4 Sheets-Sheet 1
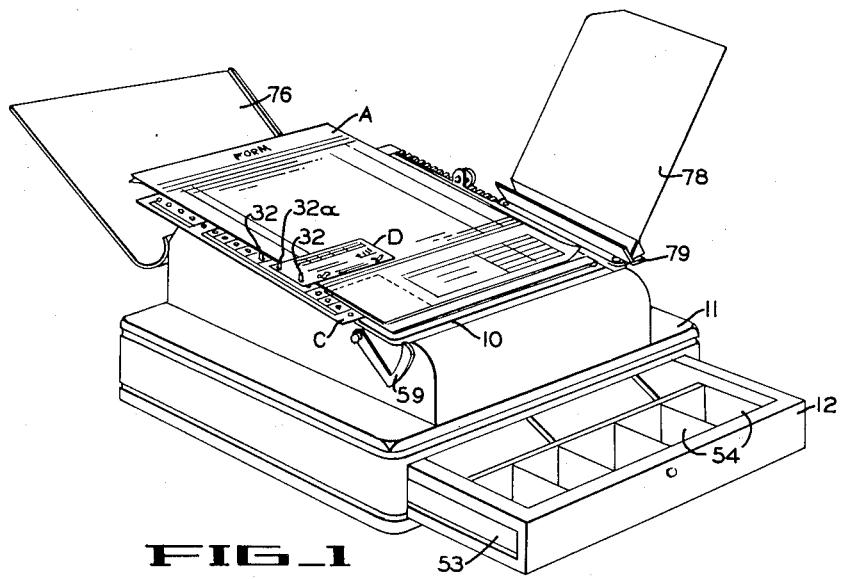
FIG_1
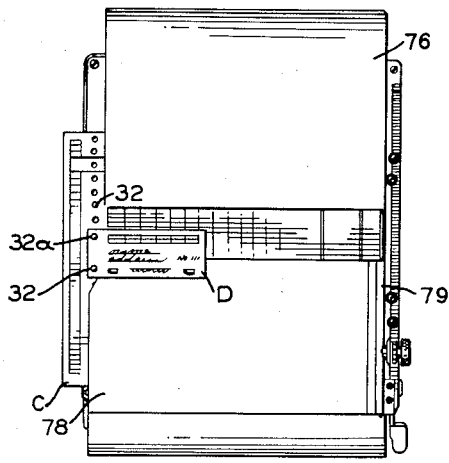
FIG_2
*INVENTOR.*
*TEDDY F. SMUSZ*
BY
*Mellin and Hanscom*
ATTORNEYS

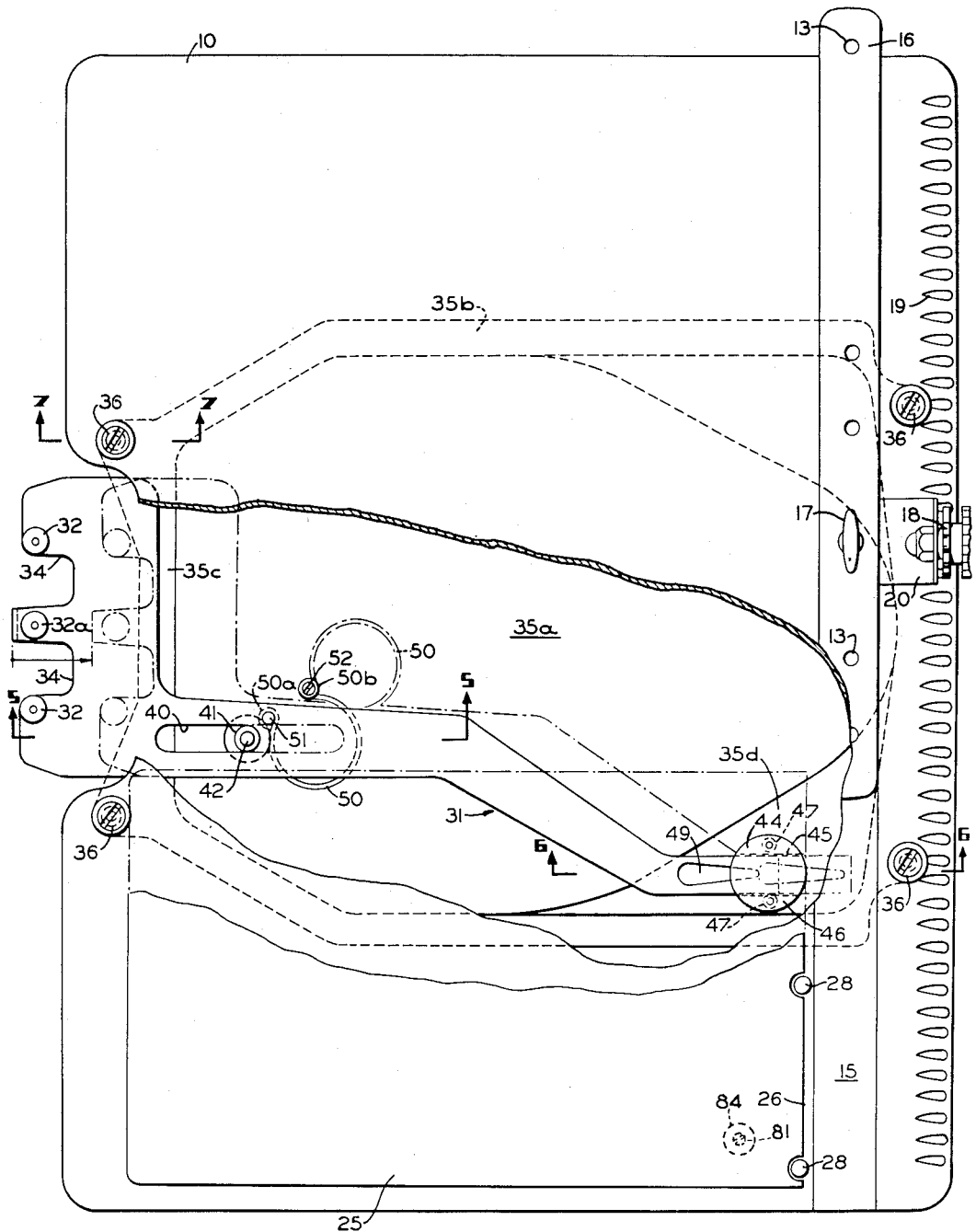

June 5, 1956     T. F. SMUSZ     2,749,032
BOOKKEEPING DEVICE WITH CASH DRAWER
Filed Dec. 4, 1953     4 Sheets-Sheet 3
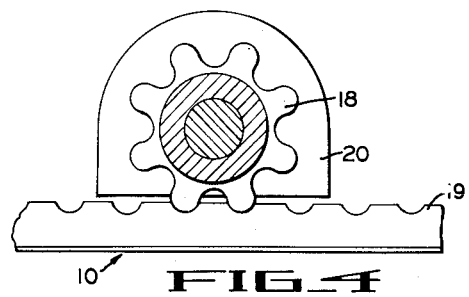
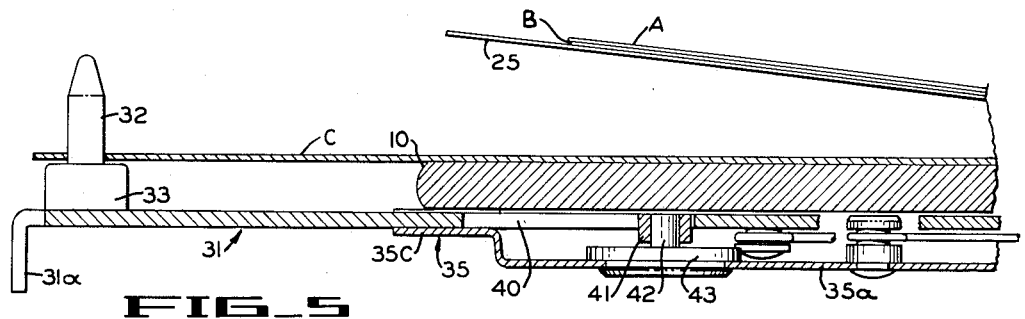
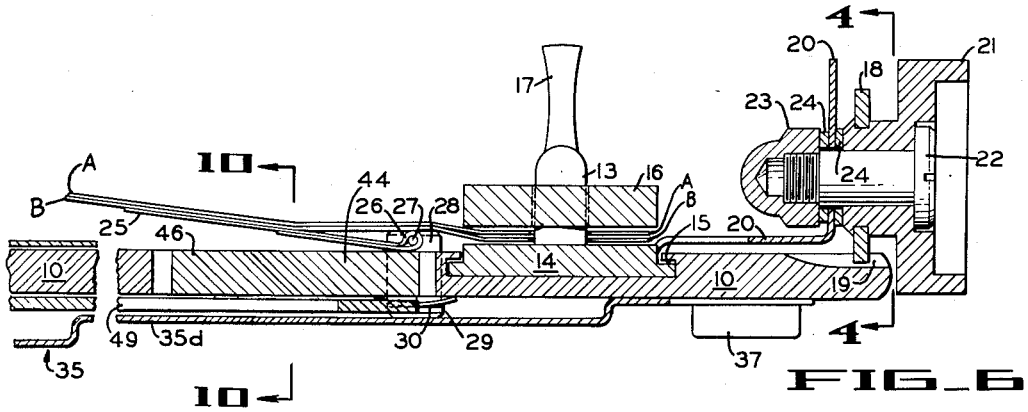
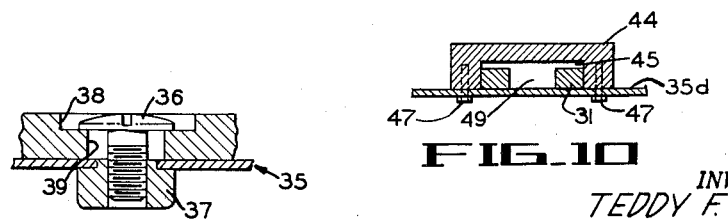
INVENTOR.
TEDDY F. SMUSZ
BY
Meelin and Hanscom
ATTORNEYS June 5, 1956  T. F. SMUSZ  2,749,032
BOOKKEEPING DEVICE WITH CASH DRAWER
Filed Dec. 4, 1953  4 Sheets-Sheet 4
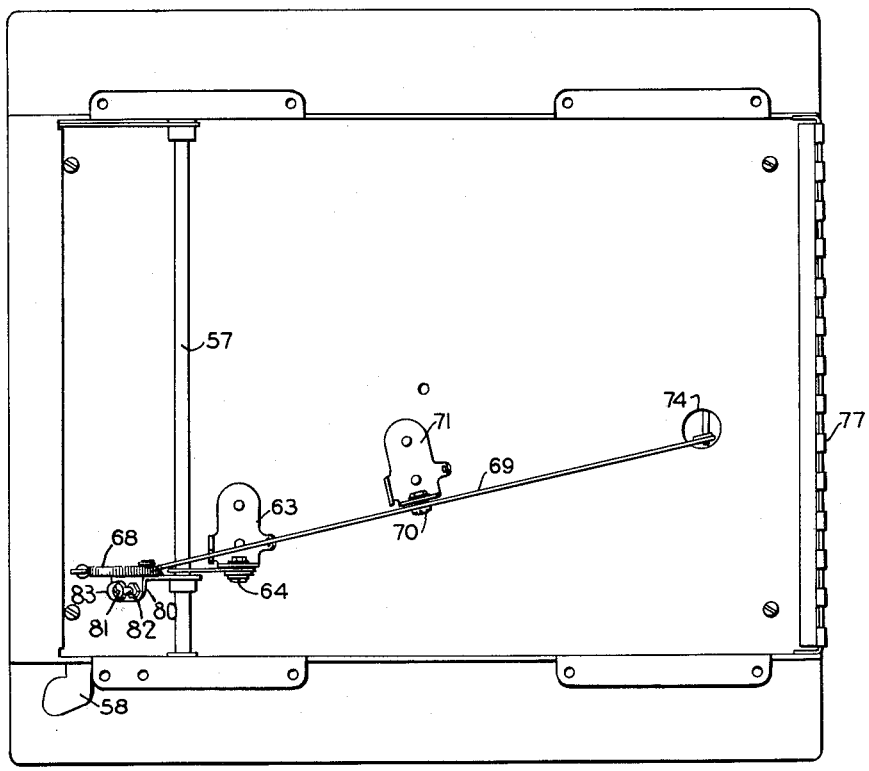
FIG_8
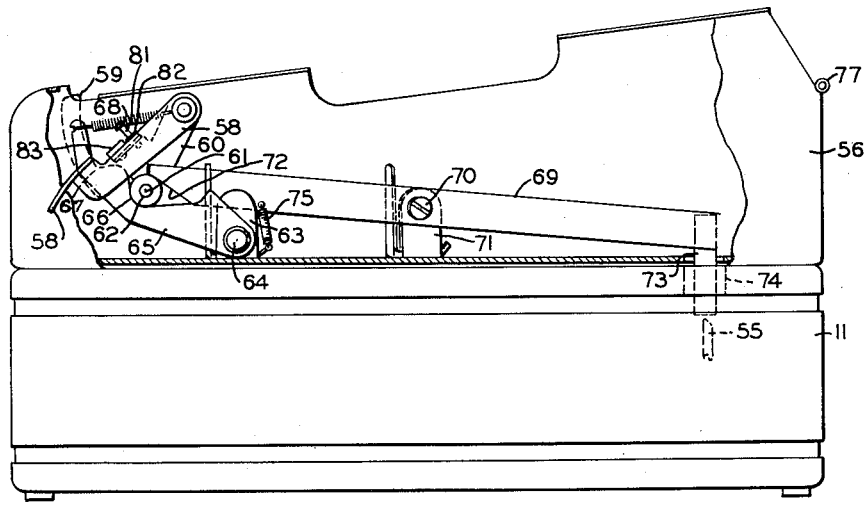
FIG_9
INVENTOR.
TEDDY F. SMUSZ
BY
Mellin and Hanscom
ATTORNEYS

United States Patent Office 2,749,032
Patented June 5, 1956

2,749,032

BOOKKEEPING DEVICE WITH CASH DRAWER

Teddy F. Smusz, Athens, Ohio, assignor, by mesne assignments, to Royal McBee Corporation, a corporation of New York Application December 4, 1953, Serial No. 396,139

3 Claims. (Cl. 235—5)

This invention relates to a cash payment bookkeeping device and more particularly to a combination of a collating board for aligning the necessary forms for simultaneously posting and receipting a cash payment, and a cash drawer to handle the cash involved in said transaction. The invention is an improvement of the collating board disclosed in a prior patent entitled "Collating Writing Board," No. 2,640,715, issued June 2, 1953, to Dudley M. Lontz.

It is the main object of the present invention to provide a combination collating board and cash drawer wherein the necessary paper work involved in a cash payment transaction may be accomplished by the collating of the necessary forms on the collating board and the cash involved may be handled efficiently by means of the cash drawer combined with the collating board.

Another object of the present invention is to provide a collating writing board provided with shields covering the major portion of the forms collated thereon, and leaving exposed only the portion whereon the current entries are actually being made.

One form which the invention may assume is exemplified in the following description and illustrated by way of example in the accompanying drawings, in which:

Fig. 1 is a perspective view of a combination collating board and cash drawer, showing the visual shields at their open position.

Fig. 2 is a plan view of the device shown in Fig. 1 having the forms in place on the collating machine with the shields closed.

Fig. 3 is a plan view of the collating board portion of the invention with the accounting cards and sheets removed and showing the collating board partially broken away to reveal the details of mechanism thereunder.

Fig. 4 is a fragmentary sectional view taken along line 4—4 of Fig. 6.

Fig. 5 is a fragmentary sectional view taken along line 5—5 of Fig. 3 showing part of the construction of the shuttle carriage.

Fig. 6 is a fragmentary sectional view along line 6—6 of Fig. 3 showing the mechanism for raising the lifting shield and the mechanism for advancing the journal and its carbon sheet.

Fig. 7 is a fragmentary sectional view taken along line 7—7 of Fig. 3 showing the manner of connecting the writing board and cover plate.

Fig. 8 is a plan view of the device with the collating board removed in order to reveal the details of the cash drawer actuating device.

Fig. 9 is a side elevation of the device having the side broken away to reveal the details of the mechanism for actuating the latch of the cash drawer.

Fig. 10 is a fragmentary sectional view taken along line 10—10 of Fig. 6 showing the details of the guide for the inner end of the shuttle carriage.

Briefly, the present invention is directed to the combination of a collating writing board including a mechanism operable for lifting a journal or like sheet and its carbon sheet to an inclined position to permit a ledger card or the like to be inserted therebeneath and placed on the writing surface of the board, and a cash drawer adapted to be urged toward its open position by means of a spring and normally held in its closed position by means of a latch.

The collating board includes a mechanism equipped with pegs or similar devices for receiving and holding a ledger card and which pegs or similar devices are adapted to be disposed in an outward position to partially expose the body of a ledger card to enable a visual comparison of the first unposted line of the ledger card with the first unposted line of the journal, and which pegs are adapted to be shifted inwardly toward the board to position the main body of the ledger card in register beneath the journal for posting purposes, and then be shifted outwardly away from the board to the first-named position to enable the removal of the posted ledger card and the insertion of an unposted ledger card.

Referring to the accompanying drawings wherein similar reference characters designate similar parts throughout, the collating writing board of the present invention includes a rigid writing board 10 mounted above and fastened to the inclosure 11, containing the cash drawer 12. A journal, generally entitled A, and a carbon sheet B, located therebeneath, as clearly shown in Fig. 6 are adapted to be held at their righthand margins as the parts are depicted in Fig. 6 by having perforations therein fitting over posting pegs 13 mounted on a slide bar 14 slidably received within a T-shaped groove 15. The journal A and the carbon sheet B are retained on the slide bar 14 by means of a retainer bar 16 which is suitably apertured to be received by pegs 13. There is a handle 17 on the retainer bar 16 to enable the retainer bar to be removed to enable removal of the journal A and carbon sheet B.

The slide bar 14, and, therefore, the journal A and carbon sheet B are adapted to be advanced in step-by-step fashion toward the top of the writing board as the parts are depicted in Fig. 3 by a mechanism including a pinion 18 engaging a rack 19 formed in the righthand edge of the writing board 10, said pinion being supported from the slide bar 14 by means of a flexible bracket 20 and driven by a knob 21 to which it is fixedly secured. Flexible bracket 20 is secured at one end to slide bar 14 and forces pinion 18 into yielding engagement with the notches of the rack 19, thereby maintaining a driving relationship between the pinion and the rack. The knob 21 is rotatably mounted on bracket 20 by means of a shoulder screw 22 receivable through the knob, said shoulder screw having an acorn nut 23 threaded against the shoulder of the shoulder screw, there being suitable washers 24 between the bracket, knob and acorn nut.

A step-by-step and line-by-line advancement of the slide bar, and, therefore, the journal sheet A and carbon sheet B, is obtained because the distance from the axis of the pinion to the rack 19 is greater when a single tooth is in full engagement with a notch as compared to the position shown in Fig. 4 where two teeth of the pinion are in engagement with two notches of the rack 19, whereby the flexible bracket is deformed a greater extent when only a single tooth is in engagement with the rack. The flexible bracket, therefore, will urge the pinion to remain in the position in which two teeth are in engagement with the rack. Rack 19 is so designed that its notches are spaced the same distance apart as the posting lines of the journal, and, therefore, the posting lines of the journal are advanced in a step-by-step movement toward the top of the writing board as knob 21 is rotated.

Journal A and carbon sheet B are adapted to be lifted to an inclined position by a lifting shield 25 which is provided with knuckles 26 to pivotally receive a hinge pin 27 mounted on hinge pin mounting studs 28 receivable through apertures or holes in the writing board, as clearly shown in Fig. 6. There are spring washers 29 on studs 28 disposed between heads 30 of studs 28 and the bottom of writing board 10. Lifting shield 25 is adapted to be lowered and raised by mechanism hereinafter described.

Shuttle carriage 31 is provided at its outer end, as clearly shown in Fig. 5, with posting pegs 32 and 32a having shoulders 33, which posting pegs are adapted to receive a ledger card C which is suitably perforated along its lefthand margin, as the parts are depicted in Fig. 2 to enable the ledger card to be selectively positioned on the pegs, thereby enabling any one of the various posting lines of the ledger card to be aligned with the center posting peg 32a, which is preferably suitably marked so as to be identified apart from the other two posting pegs. As is obvious from Fig. 5, the left hand margin of the ledger card C rests on the shoulders 33 of the pegs 32 and 32a and, therefore, is supported in the same plane as the body of the ledger card, which is supported by the writing surface of the rigid writing board 10. There are suitable recesses at 34 on the outer end of the carriage 31 to accommodate the fingers of the operator to enable easy removal and application of the ledger cards to the pegs.

As is clearly shown in Fig. 3, the outer end of the shuttle carriage 31 and the pegs 32 and 32a are disposed above the shield 25, considered in a horizontal plane, so that there is a space between the posting line peg 32a and the upper edge of the shield 25 equal to a limited number of posting lines to allow for several more posting operations on a single ledger card with the ledger card in one position before encountering the shields. Conveniently, the space may be equal to from five to ten posting lines. Obviously, there can be no posting in the area of the shield 25 since it covers the ledger therebeneath.

Shuttle carriage 31 has a handle 31a at the outer end thereof and disposed opposite the posting line peg 32a, as can be appreciated by a comparison of Figs. 3 and 5, to enable shuttling of carriage 31.

Shuttle carriage 31 is slidably supported beneath the writing board 10 by means of a cover plate 35 secured to writing board 10 by four screws 36. Cover plate 35 is perferably a stamped sheet metal element having a depressed central portion 35a to accommodate and support various parts to be described, a periperal generally U-shaped securing flange portion 35b, and shoulders 35c and 35d, shoulder 35c being disposed at the lefthand end of cover plate 35 as the parts are depicted in Fig. 3, and shoulder 35d being disposed adjacent to the lower righthand corner of cover plate 35 between central portion 35a and securing flange 35b. Shoulder 35c supports carriage 31 adjacent to the outer end thereof as shown in Fig. 5, and shoulder 35d supports the inner end of carriage 31 as shown in Fig. 6.

Screws 36 thread into nuts 37 riveted to cover plate 35. As is clearly shown in Fig. 7, the writing board 10 is counterbored at 38 to an extent substantially larger than the heads of the screws, to accommodate the heads of the screws, and bores 39 in the writing board, which received the shanks of the screws are susbtantially larger than the shanks to enable a shifting of the writing board and cover relative to one another to allow for an initial adjustment of peg 32a with respect to the journal advancing mechanism so that whenever pinion 18 is at rest, a posting space on the journal is disposed opposite and in alignment with peg 32a.

Shuttle carriage 31 is guided adjacent its outer end and inner ends for transverse sliding movement relative to writing board 10. Adjacent its outer end, shuttle carriage 31 has a guide slot 40 therein (compare Figs. 3 and 5) which receives a roller 41 mounted on a pin 42 preferably formed integrally with a rivet 43 mounted on the central portion 35a of cover plate 35. The inner end of shuttle carriage 31 is slidably received in a groove 45 machined in a carriage guide 44 fastened to the cover plate 35 by drive screws 47. The carriage guide 44 extends upwardly from the cover 35 into a suitable opening provided in the writing board 10, and the upper surface of said guide 44 is in the same plane as the upper surface of the writing board.

There is an over-center spring mechanism for urging the shuttle carriage 31 to remain in either its extreme outward or extreme inward position in whichever position the shuttle carriage is moved. This over-center spring mechanism includes a C-shaped spring 50 having an eye 50a, formed at one end thereof, disposed on a rivet 51 secured to the shuttle carriage 31, as shown in Fig. 5, and another eye 50b, formed at the other end thereof, disposed on a rivet 52 secured to the cover plate 35. Spring 50, as the parts are depicted in Fig. 3, urges the carriage into its outermost position. When the carriage is shoved inwardly over-center spring 50 will snap over center and assume the dot-dash position shown in Fig. 3, therefore urging the carriage to remain at its innermost position.

As can thus be seen in Figs. 1 and 2, there is provided an upper shield 76 hinged to the housing 56 by means of a hinge 77 shown in Figs. 8 and 9. There is also provided a lower shield 78 hinged at its right side to the right hand side of the housing 56 as shown at 79. It can be seen that by the provision of these two shields which expose only the few lines in the central portions of the ledger journal which are currently being posted, the ledger journal is effectively shielded from a person making a payment and it is impossible for him to determine what the previous payment was, and by whom it was made.

The cash drawer 12 consists of a drawer having guide grooves 53 in the side thereof in cooperation with rollers (not shown) within the interior of the enclosure 11. As is usual, the interior of the drawer is divided into several money receiving compartments 54, the cash drawer 11 is normally urged toward its open position by means of a spring (not shown) and held in its closed position by means of a latch mechanism (not shown) having an actuating finger 55.

Mounted on top of the enclosure 11 is a trapezoidal shaped enclosure 56, shown in Fig. 9, which supports the collating writing board on its upper surface and houses within itself the actuating mechanism for releasing the latch of the cash drawer in order to open the same and for raising the lower visual shield 78 and the journal lifting shield 25. Mounted in the housing 56 adjacent the upper portion and the forward edge thereof there is an oscillatable shaft 57 having an actuating lever 58 attached to one of its ends, said operating lever being outside of the side wall of the housing 56 on the right side of the device. Mounted to the opposite end of the shaft 57 adjacent to, and outside of, the left side of the housing 56 there is a visual shield raising lever 59 the purpose of which will be described presently.

The mechanism for operating the cash drawer latch and raising the journal lifting shield 25 is best shown in Figs. 8 and 9, and comprises a detent arm 60, fixedly secured to the operating shaft 57, and carrying thereon a detent roller 62 mounted for rotation on a pin 61 attached to the detent arm 60. The detent roller 62 is adapted to contact the surface of a cam arm 65. Cam arm 65 is pivotally attached on a shaft 64 which in turn is mounted on a bracket 63 fixed to the bottom of the housing 56. The cam arm has an upper surface having two low portions 66 and 67 respectively, representing the two stop positions of the operating arm 58. One end of spring 68 engages a notch in the end of the cam arm opposite the pivot 64, the opposite end of the spring is fixed to the shaft 57 whereby said cam arm is urged to rotate in a clockwise direction, as seen in Fig. 9, toward the detent roller 62.

Detent arm 60 has adjacent its upper edge a lateral flange 80. Threaded into said lateral flange is the lifting shield actuating screw 81 having a lock nut 82 whereby the length of the screw protruding from the flange 81 may be adjusted and locked. Fixed to said flange 80 is a rubber bumper 83 adapted to contact the undersurface of the writing board 10 and limit clockwise movement of the arm 60 and the parts associated therewith. Writing board 10 is provided with a hole 84 adjacent the lower right-hand corner thereof through which the shield actuating screw 81 passes to contact and raise the lifting shield 25, when the hand lever 58 is raised.

As best seen in Fig. 9, the upper end of the shield raising lever 59 leads the upper end of the shield actuating screw 81 by several degrees, whereby when the lever 58 is raised, lever 59 will start to raise the lower visual shield 78 before the shield actuating screw 81 starts to raise lifting shield 25.

A latch operating arm 69, is mounted adjacent its midportion to a pivot shaft 70 which in turn is connected to a bracket 71 fixed to the lower portion of the housing 56. The forward end of said actuating arm 69 has its lower portion chamfered as shown at 72 providing a camming surface for engagement with the detent roller 62. The rear end of the arm 69 has affixed thereto a vertical rod 73 adapted to contact the latch actuating finger 55 previously described. The vertical rod 73 extends through a suitable aperture 74 provided in the partition between the enclosures 56 and 11. A spring 75 is attached at one of its ends to the lower portion of the bracket 63 and at its other end to the actuating arm 69. The spring 75 tends to rotate said arm in a counter-clockwise direction against the action of the detent roller 62.

The collating writing board is operated in the following manner. Journal A and carbon sheet B, having perforations therein, are applied to the posting pegs 13 on the slide bar 14 and are retained in place by the retainer bar 16. The knob 21 is then rotated to advance the journal sheet toward the position where the first unposted line of journal A is opposite the posting line peg 32a. Shuttle carriage 31 is moved to its outer position, and the operating lever 58 is raised to first cause the finger 59 to raise the visual shield 78, and then cause the screw 81 to raise the journal lifting shield 25 to an inclined position providing a gap between the shield and the writing surface of the board 10. Into this gap, the ledger card C is inserted and placed onto the pegs 32 and 32a with the first unposted line of the ledger card in alignment with the posting line peg 32a. In this position, the body of the ledger card is next to the writing surface of the writing board 10 and is exposed at the lefthand margin thereof, to enable a visual comparison of the first unposted lines of the journal and ledger card. After the visual inspection proves a correct alignment of the first unposted lines of the journal and ledger, operating lever 58 is lowered to the position shown in Fig. 9 and shuttle carriage 31 is moved inwardly by means of the handle 31a so that the body of the ledger card C is fully disposed beneath the journal A and in correct posting position with reference thereto. A receipt form D is then placed on the lowermost peg 32 and on the posting peg 32a with the posting portion thereof in alignment with the posting peg 32a. An entry is, therefore, simultaneously made on the journal sheet, the receipt, and posted to the ledger card by means of the carbon sheet B and a carbon backing on the receipt. Several more posting entires may be made without moving the ledger card or journal, since, as before pointed out, there are a number of posting line spaces between the upper edge of the shields 25 and 78 (considered in a horizontal plane) and the posting line peg 32a.

During the posting operation, the operator can rest his writing hand on the lower shield 78 disposed above the journal A with the assurance that there will be no smudging or smearing of the carbon against the ledger sheet.

When the actuating lever 58 is further depressed the cam arm is rotated down against the action of the spring 68 and the detent roller 62 contacts the chamfered portion 72 of the actuating arm 69 thus forcing the forward end of the arm upward and hence the rear end of the arm and the member 73 downward to contact the latch actuating finger 55 and actuate the latch to cause the cash drawer 12 to open up under the influence of the spring (not shown). When the actuating lever 58 is released the parts will return to the position shown in Fig. 9.

From the description set forth herein in conjunction with the accompanying drawings, it may be seen that I have provided a collating board adapted for posting of a daily ledger journal, individual account cards, and receipts, simultaneously mounted on a collating board in proper register with each other, in combination with a cash drawer whereby the account may be posted and the money accepted and change made all by use of the unitary device provided.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In combination a housing, a collating device, comprising a writing board adapted to receive and collate in proper register the necessary forms including a daily cash posting ledger sheet for recording a cash payment bookkeeping transaction, an upper cover shield hinged to the top of the collating board covering the upper portion of the ledger sheet, a lower cover shield hinged to the side edge of the board covering the lower portion of the ledger sheet, whereby only the central portion of the ledger is exposed, and a cash drawer mounted for sliding movement into and out of the lower portion of said housing, spring means normally tending to move said drawer toward its outer position, latch means retaining the drawer in closed position, and means in the upper portion of said housing comprising an actuating lever outside of the housing for either releasing said latch means or for raising said lower cover shield to permit removal or insertion of the necessary forms on said collating board.

2. In combination a housing, a collating device, mounted on the top of said housing, comprising a writing board adapted to collate in proper register a plurality of sheets on the upper surface thereof, a sheet lifting member mounted on the board adjacent one side margin thereof for swinging movement from a horizontal to an inclined position to lift the top sheet and enable a second sheet to be inserted between the first sheet and the writing board, means for raising said sheet lifting member, an upper cover shield hinged to the top of the collating board covering the upper portion of the sheet, a lower cover shield hinged to the same edge of the board as said lifting member whereby only the central portion of said sheet is exposed, and a cash drawer mounted for sliding movement into and out of the lower portion of said housing, spring means normally tending to move said drawer toward its outer position, latch means retaining said drawer in closed position, and means in the upper portion of said housing comprising an actuating lever outside of the housing for either releasing said latch means or for raising said lower cover shield to permit removal or insertion of ledger sheets on said collating board.

3. A collating device comprising a writing board adapted to collate in proper register a plurality of sheets on the upper surface thereof, a sheet lifting member mounted on the board adjacent one side margin thereof for swinging movement from a horizontal to an inclined position to lift the top sheet and enable a second sheet to be inserted between the top sheet and the writing board, an upper shield hinged adjacent the upper edge of the board and adapted to shield from view substantially the upper half of the board, and a lower shield hinged adjacent the same edge of the board as said sheet lifting member and adapted to be raised thereby, said lower shield adapted to shield from view substantially the lower half of said board but being spaced from the lower edge of said upper shield a distance approximately equal to five lines on said form.

References Cited in the file of this patent

UNITED STATES PATENTS

| | | |
|---|---|---|
| 1,223,759 | Bristow | Apr. 24, 1917 |
| 1,307,679 | Krauth | June 24, 1919 |
| 1,631,395 | Barker et al. | June 7, 1927 |
| 2,111,319 | Euth | Mar. 15, 1938 |
| 2,344,453 | Payne | Mar. 14, 1944 |
| 2,494,142 | Pfeiffer et al. | Jan. 10, 1950 |
| 2,640,715 | Lontz | June 2, 1953 |
| 2,643,114 | Lashey | June 23, 1953 |